United States Patent
Varone

(10) Patent No.: US 7,077,258 B2
(45) Date of Patent: Jul. 18, 2006

(54) MODULAR LOW FRICTION SPINDLE ASSEMBLY

(75) Inventor: Russell Varone, Red Lion, PA (US)

(73) Assignee: Graham Packaging Company, LP, York, PA (US)

( * ) Notice: Subject to any disclaimer, the term of this patent is extended or adjusted under 35 U.S.C. 154(b) by 126 days.

(21) Appl. No.: 10/830,131

(22) Filed: Apr. 23, 2004

(65) Prior Publication Data

US 2005/0241912 A1    Nov. 3, 2005

(51) Int. Cl.
*B65G 47/84* (2006.01)
(52) U.S. Cl. .................................. 198/379; 33/559
(58) Field of Classification Search ............... 193/37; 198/379, 470.1; 118/107, 232; 269/48.1; 33/559

See application file for complete search history.

(56) References Cited

U.S. PATENT DOCUMENTS

| | | | | |
|---|---|---|---|---|
| 2,830,821 | A | * | 4/1958 | Bystrom ................ 279/2.17 |
| 3,649,465 | A | * | 3/1972 | Scharf et al. ............ 435/302.1 |
| 4,640,406 | A | * | 2/1987 | Willison .................. 198/379 |
| 4,927,205 | A | | 5/1990 | Bowler et al. |
| 5,284,229 | A | * | 2/1994 | Logan et al. ............. 118/107 |
| 5,419,427 | A | | 5/1995 | Wurgler |
| 5,558,200 | A | | 9/1996 | Whitby et al. |
| 5,769,476 | A | | 6/1998 | Lawn et al. |
| 5,806,200 | A | * | 9/1998 | Brenner et al. ............ 33/559 |
| 6,344,656 | B1 | * | 2/2002 | Hopkins et al. ........ 250/559.22 |

* cited by examiner

*Primary Examiner*—James R. Bidwell
(74) *Attorney, Agent, or Firm*—Venable LLP; James R. Burdett; Keith G. Haddaway

(57) ABSTRACT

Spindle assemblies include an upper spindle shaft with an undercut section, which reduces wear on parts. Assemblies include a depth stop on a probe pin to ensure accurate alignment upon reassembly with minimal time and effort.

32 Claims, 2 Drawing Sheets

MODULAR LOW FRICTION SPINDLE ASSEMBLY

BACKGROUND OF THE INVENTION

1. Field of the Invention

The present invention relates to a spindle assembly which can be used as a component of an object transport system, i.e., a conveyor. More particularly, the present invention pertains to a spindle assembly that can be rapidly disassembled to allow cleaning and maintenance and can be rapidly reassembled with precise location of parts with respect to each other.

2. Description of the Related Art

A spindle assembly can be used as a component of an object transport system, e.g., an object carrying and rotating system, to carry an object through an operation or from one operation to another. A spindle assembly is able to rotate, allowing, for example, proper orientation of an object prior to an operation, orientation of an object during an operation, or continuous rotation of an object during an operation. For example, in the manufacture of certain plastic containers for food container applications, the containers are sprayed with a coating which inhibits the flow of oxygen into the interior of the container. Each container of a number of containers is placed onto a spindle assembly at a first station and is then transported by an object carrying and rotating system through a spray booth. The spindle assembly should allow each container to rotate in the spray booth to promote even distribution of the sprayed coating on the container. After exiting the spray booth, the containers continue to be transported to allow drying and/or cure of the coating on the container, either through exposure to the air under ambient conditions or through exposure to elevated temperatures in an oven. At a second station, each container is removed from the spindle assembly for further processing or for storage and shipping.

Previous spindle shaft assemblies have suffered from several limitations. For example, the spindle shaft assemblies presented in U.S. Pat. Nos. 4,927,205, 5,419,427, 5,558,200, and 5,769,476 all require removal of multiple parts in order to allow separation of the two sets of parts which rotate relative to each other. For example, in the spindle assembly presented in U.S. Pat. No. 5,419,427, a cap at the bottom of a spindle, labeled 46 in the patent document, must be unscrewed in order to access the hollow interior of the spindle 46 and the fastener 53 therein. The fastener 53 must then be unscrewed in order to separate the spindle 46 from the attachment pin 45. Such disassembly may be required at intervals in order to clean the interior of the spindle 46 and to clean the surfaces of the bushing 49 and the attachment pin 45 which move relative to each other during rotation. The need to remove or separate multiple parts in order to access and clean surfaces which move relative to each other, instead of needing to remove or separate only one part, results in an increase in disassembly time. Because a large number of spindle assemblies can be attached to a conveyor, the total increase in time for disassembly and cleaning or maintenance of all spindle assemblies can be substantial. Similarly, the need to reassemble multiple parts after cleaning or maintenance results in an increase in reassembly time. Furthermore, prior art spindle assemblies require an alignment procedure during reassembly to ensure that the proper clearance between parts which move relative to each other is established. Such an alignment procedure can be time consuming, require a skilled technician, and ultimately result in a poor alignment.

Because many spindle assemblies can be suspended from a conveyor, the total weight of the spindle assemblies must be considered in the design of and support for a conveyor. The additional support required for a conveyor carrying spindle assemblies can necessitate an increase in bulk and cost of a conveyor.

The large number of parts which constitute prior art spindle assemblies require a large number of replacement parts to be inventoried. The large number of parts in a spindle assembly increases the chances of improper interaction between the parts. For example, if there are a large number of parts which are screwed into another part, the chance of a thread in the assembly stripping is increased over the chance of a thread in an assembly having only a small number of screwed parts stripping.

In previous spindle assemblies, there is a large surface area between parts that move relative to each other with only small clearance between the parts. For example, in the spindle assembly presented in U.S. Pat. No. 5,769,476 the clearance is small between the surface of the shaft 54 and the surface of the bore of the spindle 56. The small clearance appears constant over the length of the shaft 54 which is located within the bore of the spindle 56. When parts of the spindle assembly rotate relative to each other, wear can occur leading to the production of debris. In prior art spindle assemblies that have a large surface area between parts with only small clearance to allow rotation, this debris and other residue, e.g., from a coating operation, can accumulate in the clearance space. Because the clearance is small, after a short period of time, sufficient debris and residue can accumulate in the clearance space and impede rotation or bind the parts such that they no longer can rotate relative to each other. Moreover, the debris and residue can result in increased friction which induces wear of the shaft and the spindle, leading to the production and accumulation of even more debris. For such previous spindle assemblies having a large surface area between parts that move relative to each other with only small clearance between the parts, binding resulting from accumulation of debris and residue can necessitate frequent disassembly and cleaning of the spindle assembly, with high costs associated with manufacturing downtime and labor.

Previous spindle assemblies have had problems with parts unscrewing, because of torque exerted between parts which rotate relative to each other. Such unscrewing can result in the sudden failure of a spindle assembly during operation.

There thus remains an unmet need for a spindle assembly that can operate for a long time before disassembly and cleaning is required, has a small number of constituent parts, can be rapidly and easily disassembled as required for maintenance and cleaning, can be rapidly and easily reassembled with a precise alignment of parts, with no alignment procedure required, and which does not have problems with sets of parts which move relative to each other unscrewing during operation.

SUMMARY OF THE INVENTION

It is therefore an object of the present invention to provide novel spindle assemblies that can operate for a long time before disassembly and cleaning is required, have a small number of constituent parts, can be rapidly disassembled as required for maintenance and cleaning, can be rapidly reassembled with a precise alignment of parts, with no particular alignment procedure required, and which do not have problems with sets of parts which move relative to each other unscrewing during operation.

An upper spindle shaft of the present invention can include an upper section, a lower section, and an undercut section, which is located between the upper section and the lower section.

A spindle shaft set can comprise an upper spindle shaft and a probe pin. The lower section of the upper spindle shaft can include a threaded spindle shaft receptacle. The probe pin can have a first end and a second end opposite, i.e., distal, to the first end, and can include a probe knob with a support ledge at the first end and probe threads vicinal to the second end. The probe threads can be screwed into the threaded spindle shaft receptacle. The threaded spindle shaft receptacle can include a receptacle end wall. The probe pin can include a depth stop, which extends from the probe threads to the second end of the probe pin. When the probe threads are screwed into the threaded spindle shaft receptacle, the second end of the probe pin contacts the receptacle end wall.

In an embodiment, a spindle assembly includes an upper spindle shaft and a spindle. The spindle can include a spindle bore, and the upper spindle shaft can be inserted into the spindle bore. A spindle stop connected with the upper spindle shaft can limit axial motion of the upper spindle shaft relative to the spindle when the upper spindle shaft is inserted into the spindle bore. The spindle assembly can also include a probe pin capable of being inserted into the spindle bore. A shaft stop can be connected with the probe pin. The shaft stop can limit axial motion of the probe pin relative to the spindle when the probe pin is inserted into the spindle bore. The probe pin is capable of being connected with the upper spindle shaft.

In an embodiment, the upper spindle shaft and the probe pin can be inserted into the spindle bore and the upper spindle shaft and the probe pin can be connected with each other. The spindle can be in contact with the upper spindle shaft and the probe pin over less than about 50% of the length of the spindle bore. In another embodiment, the spindle can be in contact with the upper spindle shaft and the probe pin over less than about 30% of the length of the spindle bore. In another embodiment, the spindle can be in contact with the upper spindle shaft and the probe pin over from about 20% to about 25% of the length of the spindle bore.

In an embodiment, a shaft stop can be connected with the upper spindle shaft. The shaft stop can limit axial motion of the upper spindle shaft relative to the spindle when the upper spindle shaft is inserted into the spindle bore. The spindle assembly can include a locking collar fixable, i.e., capable of being affixed, to the upper spindle shaft. The locking collar can limit axial motion of the upper spindle shaft relative to the spindle when the upper spindle shaft is inserted into the spindle bore.

In another embodiment, the spindle can include a spindle body and a nose. The spindle body and the nose can be capable of being connected. The spindle body can include a threaded body receptacle, and the nose can include nose threads. The nose threads can be screwed into the threaded body receptacle. The nose threads can be of an opposite handedness than the probe threads.

In an embodiment, the spindle body includes a body bore. When the upper spindle shaft is inserted into the body bore, the spindle body can be in contact with the upper section and the lower section of the upper spindle shaft over less than about 60% of the length of the body bore. In another embodiment, the spindle body can be in contact with the upper section and the lower section of the upper spindle shaft over less than about 45% of the length of the body bore. In another embodiment, the spindle body can be in contact with the upper section and the lower section of the upper spindle shaft over about 40% of the length of the body bore.

In an embodiment, a spindle assembly includes a spindle shaft set and a spindle. The spindle can include a spindle bore, and the probe pin and the upper spindle shaft can be inserted into the spindle bore.

In a method for assembling a spindle assembly, an upper spindle shaft can be inserted into the spindle bore of a spindle. A locking collar can be affixed to the upper spindle shaft. The spindle can be formed by connecting a nose with a spindle body. For example, the spindle can be formed by screwing the nose threads of a nose into the threaded body receptacle of a spindle body.

In another method for assembling a spindle assembly, a probe pin and an upper spindle shaft can be inserted into a spindle bore. The probe threads of the probe pin can be screwed into the threaded spindle shaft receptacle of the upper spindle shaft. A locking collar can be affixed to the upper spindle shaft; the locking collar can include a collar bore. A positioning jig can include a support shoulder and an insertion pin connected with the support shoulder. The insertion pin can be inserted into the collar bore of the locking collar so that the support shoulder contacts the locking collar. The upper spindle shaft can be inserted into the collar bore so that the upper spindle shaft contacts the insertion pin.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

Figure 1:
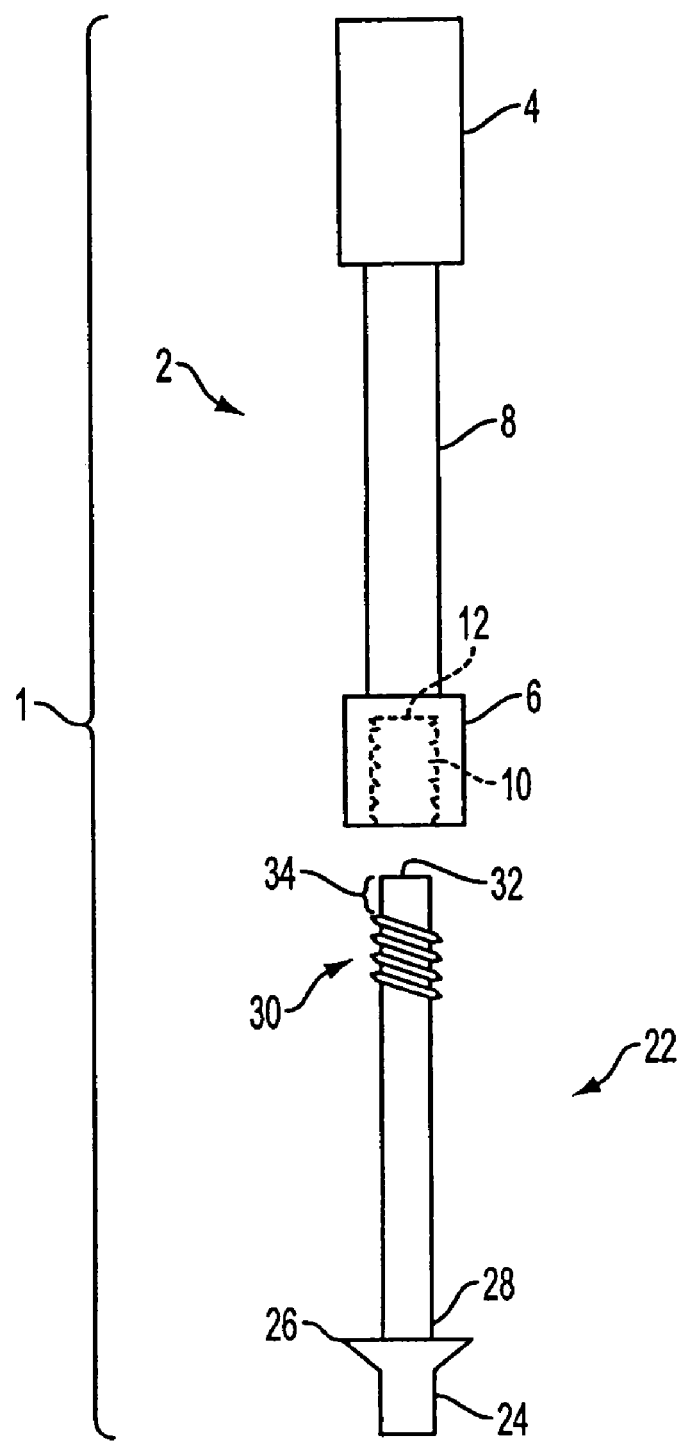
FIG. 1 is a side view of a spindle shaft set including an upper spindle shaft and a probe pin.

FIG. 1 is a side view of spindle shaft set 1 according to the invention that includes an upper spindle shaft 2 and a probe pin 22. In an embodiment, an upper spindle shaft 2 and a probe pin 22 can be connected together. For example, an upper spindle shaft 2 and a probe pin 22 can be connected together by screwing the upper spindle shaft 2 and the probe pin 22 together.

In an embodiment, the upper spindle shaft 2 includes an upper section 4, a lower section 6 and an undercut section 8. The undercut section 8 has a smaller diameter than the upper section 4 or the lower section 6 and is located between the upper section 4 and the lower section 6. The lower section 6 can have a threaded spindle shaft receptacle 10, which is a threaded cavity. The threaded spindle shaft receptacle 10 also can have a receptacle end wall 12, which is located opposite to the opening of the threaded spindle shaft receptacle 10 to the environment.

In the embodiment of the probe pin 22 illustrated in FIG. 1, the probe pin 22 has a first end 28 and a second end 32, located opposite of the first end 28. The probe pin 22 can include a probe knob 24, which can have a support ledge 26, located at the first end 28. The probe pin 22 can include probe threads 30 which are located near to the second probe pin end 32. The probe pin 22 can also have a depth stop 34, which can be an unthreaded portion of the probe pin 22, located between the probe threads 30 and the second probe pin end 32. The probe threads 30 can be screwed into the threaded spindle shaft receptacle 10 in the upper spindle shaft 2. When the probe threads 30 are screwed into the threaded spindle shaft receptacle 10, the second probe pin end 32 contacts the receptacle end wall 12 of the threaded spindle shaft receptacle 10.

Figure 2:
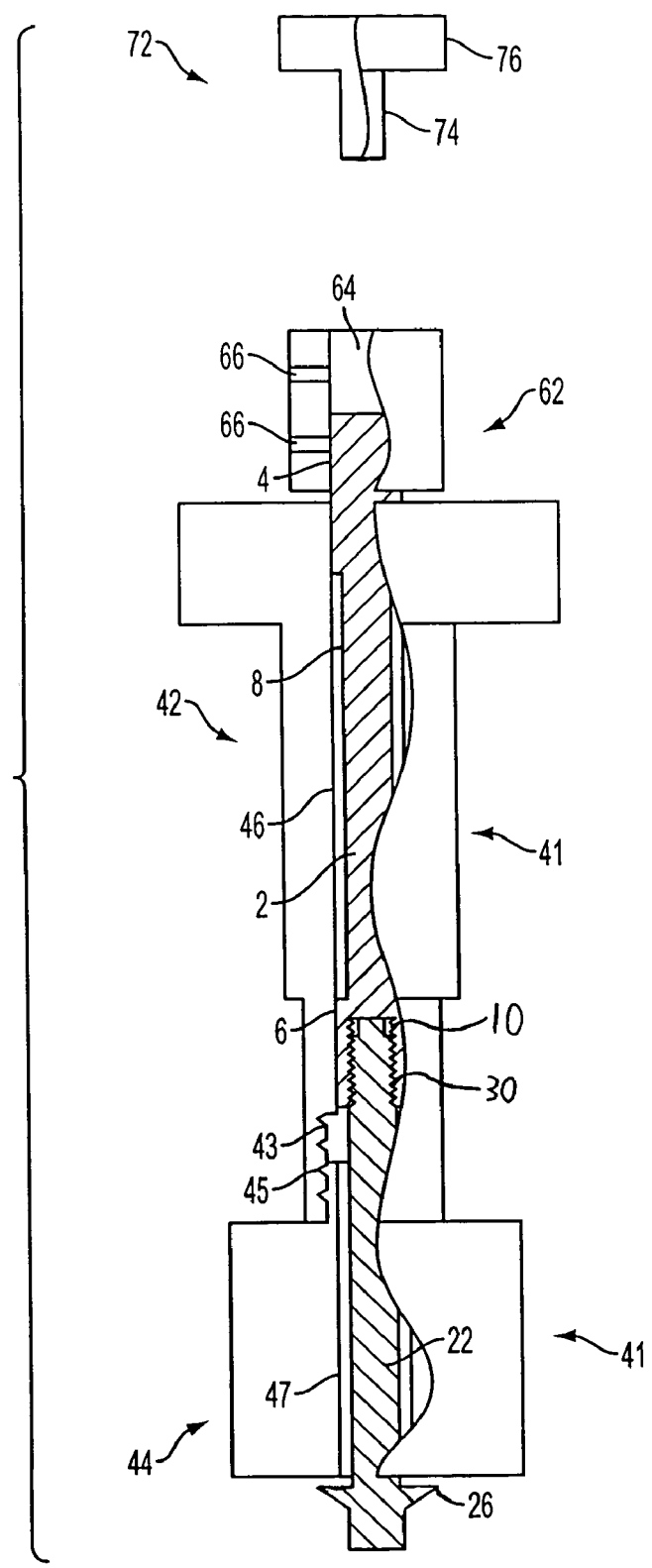
FIG. 2 is a breakaway view of a spindle assembly including an upper spindle shaft, a probe pin, a spindle body, a nose, and a locking collar.

FIG. 2 illustrates a breakaway view of an embodiment of a spindle assembly according to the invention. The exterior of the spindle assembly is shown to the right of the wavy line, and a cross section through the axis is shown to the left of the wavy line. A spindle assembly includes a spindle 41, which can include a spindle body 42. The spindle body 42 can include a body bore 46. The upper spindle shaft 2 can be inserted into the body bore 46 such that the spindle body 42 can rotate about the spindle shaft 2. When the upper spindle shaft 2 is inserted into the body bore 46, the spindle body 42 contacts only the upper section 4 and the lower section 6 of the upper spindle shaft 2. The undercut region 8 does not make contact with the walls of the body bore 46 in the spindle body 42. Thus, there is reduced contact between the walls of the body bore 46 with the spindle shaft 2. This can result in the spindle body 42 over about 60%, even less than about 45%, or over about 40% of the length of the body bore 46 contacting the upper section 4 and the lower section 6 of the upper spindle shaft 2. The upper section 4 and the lower section 6 serve to radially align the upper spindle shaft 2 with the axis of the body bore 46.

In the illustrated embodiment, it is understood that the large clearance between the spindle body 42 and the undercut region 8 allows debris and residue to accumulate adjacent to the undercut region 8, without impeding rotation of the spindle body 42 relative to the upper spindle shaft 2 for a prolonged period of time. Furthermore, because debris and residue are not trapped in regions of small clearance adjacent to the upper section 4 or to the lower section 6, the debris and residue do not induce wear of the upper spindle shaft 2 or the spindle body 42. Thus, the volume between an undercut region 8 and the spindle body 42 can serve as a "reservoir" for debris and residue, and extend the time between necessary cleaning operations beyond that for prior art spindle assemblies. Overall, having an undercut region 8 results in less friction between the upper spindle shaft 2 and the body bore 46 and less wear than if the upper spindle shaft 2 had a constant diameter.

The smaller diameter of the upper spindle shaft 2 in the undercut region 8 as compared to the diameter in the upper section 4 or the lower section 6 also results in a reduction of weight of the upper spindle shaft 2 relative to an upper spindle shaft having a uniform diameter close to the diameter of the body bore 46. The reduction of weight is advantageous, for example, when a large number of spindle assemblies are carried by a conveyor; e.g., the resultant large total reduction of weight of the spindle assemblies can reduce the structural support needed and hence reduce the cost of the entire conveyor system.

In an embodiment, a spindle stop can be connected with the upper spindle shaft 2. The spindle stop can limit axial motion of the upper spindle shaft 2 relative to the spindle 41, i.e., limit motion of the upper spindle shaft 2 along the axis of the spindle 41, when the upper spindle shaft 2 is inserted into the body bore 46. An example of a spindle stop is a locking collar 62 having a collar bore 64 into which the upper spindle shaft 2 can be inserted. After insertion, the locking collar 62 can be tightened onto the upper spindle shaft 2, e.g., by the use of set screws inserted through the channels 66 or by the use of other fasteners. The locking collar 62 can then limit axial motion of the upper spindle shaft 2 farther into the body bore 46.

In an alternative embodiment, a shaft stop can be connected with the upper spindle shaft 2. The shaft stop can limit axial motion of the upper spindle shaft 2 when the upper spindle shaft 2 is inserted into the body bore 46. A shaft stop connected with an upper spindle shaft 2 can resemble a probe pin support ledge 26 on a probe pin 22. A shaft stop can limit axial motion of an upper spindle shaft 2; for example, based on the orientation shown in FIG. 2, a shaft stop can limit motion of the upper spindle shaft 2 upwards.

Thus, a spindle stop can limit axial motion of the upper spindle shaft 2 within the body bore 46 in a first direction along the axis of the body bore 46. A shaft stop can limit axial motion of the upper spindle shaft 2 within the body bore 46 in a second direction opposite the first direction along the axis. Therefore, when both a spindle stop and a shaft stop are present, the axial position of the upper spindle shaft 2 relative to the spindle 41 can be confined within a narrow range. A spindle assembly can include the spindle 41 and the upper spindle shaft 2 inserted into the body bore 46.

The spindle 41 can include a single piece or multiple pieces. For example, the spindle 41 can include a spindle body 42 and a nose 44. The spindle body 42 and the nose 44 can be capable of being connected together to form the spindle 41. The spindle body 42 and the nose 44 can be connected together by, for example, screwing the spindle body 42 and the nose 44 together. The spindle body 42 can have a threaded body receptacle 43; the nose 44 can have complementary nose threads 45. The nose threads 45 can be screwed into the threaded body receptacle 43. The nose 44 can include a nose bore 47. When the nose 44 and the spindle body 42 are connected with each other, the body bore 46 through the spindle body 42 and the nose bore 47 through the nose 44 form a spindle bore. When the spindle 41 is a single piece, the body bore 46, which extends continuously through the spindle 41, forms the spindle bore.

In an embodiment, the spindle body 42 and the nose 44 can be connected together, for example, the spindle body 42 and the nose 44 can be screwed together, to form a spindle 41. The upper spindle shaft 2 and the probe pin 22 can then be inserted into the spindle bore formed from the body bore 46 and the nose bore 47, and the upper spindle shaft 2 and the probe pin 22 can be connected with each other. Only the upper section 4 and the lower section 6 of the upper spindle shaft 2 contact the walls of the spindle bore. This can result in the spindle 41 over about 50%, over even less than about 30%, or over about 20% to 25% of the length of the spindle bore contacting the upper spindle shaft 2 and the probe pin 22.

In an embodiment, a spindle assembly includes a spindle shaft set 1 and a spindle 41. The spindle shaft set 1 can include an upper spindle shaft 2 and a probe pin 22. This embodiment, with a locking collar 62 affixed to the upper spindle shaft 2, is depicted in FIG. 2. The locking collar 62 can act as a spindle stop which prevents the upper spindle shaft 2 from moving farther into the spindle bore beyond the point where the locking collar 62 is in contact with the spindle 41. The probe pin support ledge 26 can have a diameter greater than the spindle bore to which it is adjacent, so that the probe pin support ledge 26 acts as a shaft stop, which prevents the probe pin 22 from moving farther into the spindle bore beyond the point where the probe pin support ledge 26 contacts the spindle 41. Thus, the locking collar 62 and the support ledge 26 can prevent an upper spindle shaft 2 and a probe pin 22, connected with each other, from being removed from the spindle bore.

In the embodiment shown in FIG. 2, the upper spindle shaft 2, the probe pin 22, and the locking collar 62 form a first set of parts; the spindle body 42 and the nose 44 form a second set of parts, i.e., the spindle 41. The spindle 41, when assembled, can rotate relative to the assembled first set of parts. The embodiment shown in FIG. 2 includes only a total of five parts, fewer than in prior art spindle assemblies. Because there are fewer parts, fewer replacement parts must be kept in inventory and the chance of a failure of the spindle assembly because of the failure of a part is reduced in comparison to that of a spindle assembly with a large number of parts.

In other embodiments of the invention, fewer than five parts could be used; for example, the upper spindle shaft 2 and the locking collar 62 could be integrated as a single part, and the spindle body 42 and the nose 44 could be integrated as a single part so that, with the probe pin 22, the spindle assembly would include only a total of three parts. As another example of an alternative embodiment, the upper spindle shaft 2 and the probe pin 22 could be integrated as a single part, and the spindle body 42 and the nose 44 could be integrated as a single part so that, with the locking collar 62, the spindle assembly would include only a total of three parts.

In the embodiment shown in FIG. 2, the spindle assembly can be rapidly and easily disassembled to allow, for example, cleaning and repair, by separating only a single pair of parts. By unscrewing the probe pin 22 from the upper spindle shaft 2, the probe pin 22 and the upper spindle shaft 2 can be separated, and the spindle 41, including both the spindle body 42 and the nose 44, can be removed from the upper spindle shaft 2. Similarly, the spindle assembly can be rapidly and easily reassembled.

In an embodiment, the nose threads 45 of the nose 44 are of opposite handedness than the probe threads 30 of the probe pin 22. In such a case, it follows that the threads of the threaded body receptacle 43 of the spindle body 42 have opposite handedness than the threads of the threaded spindle shaft receptacle 10 of the upper spindle shaft 2. Such a spindle assembly, as further illustrated by FIG. 2, can have low susceptibility to unscrewing of the parts when the nose 44 and spindle body 42 are rotated in a particular direction relative to the upper spindle shaft 2 and the probe pin 22.

In the embodiment of the invention shown in FIG. 2, when torque is applied to the spindle body 42 and the upper spindle shaft 2 is held stationary, the spindle body 42 and the nose 44 can rotate as a pair relative to the upper spindle shaft 2, the probe pin 22, and the locking collar 62. Frictional contact between the nose 44 and the support ledge 26 results in the imposition of torque between the spindle body 42 and the nose 44 and between the probe pin 22 and the upper spindle shaft 2. If the torque applied to the spindle body 42 is in a direction which would act to tighten the nose 44 with the spindle body 42, were the nose 44 held still, and the threads joining the probe pin 22 and the upper spindle shaft 2 have handedness opposite to the threads joining the nose 44 and the spindle body 42, then the following results. The frictional force between the nose 44 and the support ledge 26 acts to continually maintain a tight connection between the nose 44 and the spindle body 42, and acts to continually maintain a tight connection between the probe pin 22 and the upper spindle shaft 2.

By contrast, a tight connection between the members of both pair of parts would not be continually maintained if the threads joining the probe pin 22 and the upper spindle shaft 2 and the threads joining the nose 44 and the spindle body 42 had the same handedness. In such a case, the frictional force between the nose 44 and the support ledge 26 would act to unscrew the nose 44 from the spindle body 42 or act to unscrew the probe pin 22 from the upper spindle shaft 2.

In a method for assembling a spindle assembly, an upper spindle shaft 2, to which a spindle stop is connected, can be inserted into a spindle bore of a spindle 41. A probe pin 22 connected with a shaft stop can be inserted into the spindle bore, and the probe pin 22 and the upper spindle shaft 2 can then be screwed or otherwise fastened together.

In another method for assembling a spindle assembly, an upper spindle shaft 2, connected with a shaft stop, can be inserted into a spindle bore of a spindle 41. A locking collar 62, serving as a spindle stop, can be affixed to the upper spindle shaft 2, for example, by inserting the upper spindle shaft 2 into a collar bore 64 of the locking collar 62 and tightening the locking collar 62 onto the upper spindle shaft 2.

In a method for assembling a spindle assembly, for example, the spindle assembly depicted in FIG. 2, a spindle 41 can be formed by connecting a nose 44 with a spindle body 42. For example, nose threads 45 of a nose 44 can be screwed into a threaded body receptacle 43 of a spindle body 42. A probe pin 22 and an upper spindle shaft 2 can be inserted into a spindle bore of the spindle 41; for example, in the case of the spindle assembly shown in FIG. 2, the probe pin 22 and the upper spindle shaft 2 can be inserted into the nose bore 47 and the body bore 46. Probe threads 30 of the probe pin 22 can be screwed into a threaded spindle shaft receptacle 10 of the upper spindle shaft 2. A locking collar 62 can be affixed to the upper spindle shaft 2, for example, by inserting the upper spindle shaft 2 into a collar bore 64 of the locking collar 62 and tightening the locking collar 62 onto the upper spindle shaft 2.

The present invention allows for simple disassembly and reassembly of the spindle without the need for repeated measurement and readjustment. A depth stop 34 (see reference character on FIG. 1) on the probe pin 22 can ensure a predetermined distance between the support ledge 26 and a locking collar 62, affixed to the upper spindle shaft 2, upon reassembly. For example, the spindle assembly illustrated in FIG. 2 can be disassembled by disconnecting the probe pin 22 from the upper spindle shaft 2 in order to, say, clean or maintain the parts of the spindle assembly. For reassembly, the upper spindle shaft 2 and the probe pin 22 can then be reinserted into the spindle bore of the spindle 41 and reconnected with each other. Because of the presence of the depth stop 34, when the probe threads 30 are screwed into the threaded spindle shaft receptacle 10, the second end 32 (see reference character on FIG. 1) of the probe pin 22 contacts the receptacle end wall 12 (see reference character on FIG. 1). The distance between the probe pin support ledge 26 and the locking collar 62 is therefore the same after reassembly as before disassembly, and no additional adjustment is required. The axial movement of the spindle shaft set 1 along the spindle bore can be limited by the locking collar 62, serving as a spindle stop, and can be limited by the probe pin support ledge 26, serving as a shaft stop. The possible axial movement along the length of the spindle bore, i.e., the play, of the spindle shaft set 1 is the same after reconnecting the upper spindle shaft 2 and the probe pin 22, as before they were disconnected.

The depth stop 34 (see reference character on FIG. 1) renders reassembly of a spindle assembly of the present invention faster, more accurate, and easier than for prior art spindle assemblies for which a separate alignment procedure must be performed. A technician with minimal skill can accurately reassemble a spindle assembly according to the present invention with a minimum of care and effort. By contrast, for prior art spindle assemblies, a trained technician familiar with an alignment procedure had to perform the reassembly, which could be time consuming, difficult, and ultimately inaccurate, i.e., the actual play would be different than the target play and would vary from spindle assembly to spindle assembly. A spindle assembly according to the present invention can be disassembled, e.g., for cleaning or maintenance, and reassembled with minimum down time of a system, e.g., a transport system, of which the spindle assembly is a component.

Under some circumstances, for example, when first assembling a spindle assembly, it may be necessary to affix the locking collar 62 onto the upper spindle shaft 2. The locking collar 62 must be properly positioned with respect to the upper spindle shaft 2, in order to ensure proper, constant, and reproducible distance between the locking collar 62 and the probe pin support ledge 26 when the upper spindle shaft 2 and the probe pin 22 are connected with each other. Such proper distance is required to ensure proper play when the upper spindle shaft 2 with the locking collar 62 and the probe pin 22 are inserted into the spindle bore and connected with each other. Proper positioning of the locking collar 62 can be facilitated by the use of an alignment device, for example, the positioning jig 72, shown in FIG. 2.

The positioning jig 72 can include an insertion pin 74 and a support shoulder 76. The insertion pin 74 can be inserted into the collar bore 64 of the locking collar 62 until the support shoulder 76 makes contact with the locking collar 62. The upper spindle shaft 2 can then be inserted into the collar bore 64 at the opening of the collar bore 64 opposite of the opening into which the insertion pin 74 was inserted. The upper spindle shaft 2 can be inserted until it makes contact with the insertion pin 74. The locking collar 62 can then be affixed to, e.g., tightened onto, the upper spindle shaft 2. The positioning jig 72 can then be removed from the collar bore 64. This approach can be used to ensure the same location of the locking collar 62 on the upper spindle shaft 2 every time the locking collar 62 is affixed to the upper spindle shaft 2.

For a system in which a large number of spindle assemblies of the embodiment shown in FIG. 2 are components, e.g., a conveyor, all locking collars 62 may be made to have the same length of the collar bore 64. Similarly, the upper spindle shafts 2 may be made to all have the same length and the probe pins 22 may be made to all have the same length. The spindle bodies 42 may be made such that they all have the same length, and the noses 44 may be made such that they all have the same length. In this way, any locking collar 62, upper spindle shaft 2, probe pin 22, spindle body 42 and nose 44 may be interchanged with another part of the same type to assemble a standard spindle assembly. One positioning jig 72, or several positioning jigs 72, all having the same length of the insertion pin 74, can be used to assemble all of the spindle assemblies such that each spindle assembly exhibits the same distance of play of the spindle shaft set 1 in the spindle bore.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A spindle assembly, comprising:
a spindle having a spindle bore; and
an upper spindle shaft having an upper section, a lower section, and
an undercut section, located between said upper section and said lower section,
said upper spindle shaft located at least partially within said spindle bore and capable of rotating with respect to said spindle.

2. The spindle assembly of claim 1, further comprising a spindle shaft set comprising said upper spindle shaft of claim 1,
said lower section comprising a threaded spindle shaft receptacle, and further comprising
a probe pin having a first end and a second end distal to said first end that comprises
a probe knob with a support ledge at said first end and probe threads vicinal to said second end,
said probe threads capable of being screwed into said threaded spindle shaft receptacle.

3. The spindle assembly of claim 2,
said threaded spindle shaft receptacle comprising a receptacle end wall,
said probe pin further comprising a depth stop,
said depth stop extending from said probe threads to said second end of said probe pin, and
said second end of said probe pin contacting said receptacle end wall when said probe threads are screwed into said threaded spindle shaft receptacle.

4. The spindle assembly of claim 1,
further comprising a spindle stop connected with said upper spindle shaft,
said spindle stop capable of limiting axial motion of said upper spindle shaft relative to said spindle.

5. The spindle assembly of claim 4,
further comprising,
a probe pin capable of being inserted into said spindle bore and
a shaft stop connected with said probe pin,
said shaft stop capable of limiting axial motion of said probe pin relative to said spindle when said probe pin is inserted into said spindle bore, and
said probe pin capable of being connected with said upper spindle shaft.

6. The spindle assembly of claim 5,
said spindle being in contact with said upper spindle shaft and said probe pin over less than about 50% of a length of said spindle bore, when said upper spindle shaft and said probe pin are inserted into said spindle bore and said upper spindle shaft and said probe pin are connected with each other.

7. The spindle assembly of claim 6,
said spindle being in contact with said upper spindle shaft and said probe pin over less than about 30% of a length of said spindle bore, when said upper spindle shaft and said probe pin are inserted into said spindle bore and said upper spindle shaft and said probe pin are connected with each other.

8. The spindle assembly of claim 7,
said spindle being in contact with said upper spindle shaft and said probe pin over from about 20% to about 25% of a length of said spindle bore, when said upper spindle shaft and said probe pin are inserted into said spindle bore and said upper spindle shaft and said probe pin are connected with each other.

9. The spindle assembly of claim 1, further comprising a locking collar fixable to said upper spindle shaft.

10. The spindle assembly of claim 1,
said spindle further comprising a spindle body and a nose.

11. The spindle assembly of claim 10,
said spindle body comprising a body bore, and
said spindle body being in contact with said upper section and said lower section of said upper spindle shaft over less than about 60% of a length of said body bore, when said upper spindle shaft is inserted into said body bore.

12. The spindle assembly of claim 11,
said spindle body being in contact with said upper section and said lower section of said upper spindle shaft over less than about 45% of a length of said body bore, when said upper spindle shaft is inserted into said body bore.

13. The spindle assembly of claim 12,
said spindle body being in contact with said upper section and said lower section of said upper spindle shaft over about 40% of a length of said body bore, when said upper spindle shaft is inserted into said body bore.

14. A spindle assembly, comprising:
a spindle; and
a probe pin, comprising a first end, a second end distal to said first end, a probe knob with a support ledge at said first end, and a depth stop,
said probe pin capable of rotating with respect to said spindle.

15. The spindle assembly of claim 14,
said probe pin further comprising probe threads vicinal to said second end, said depth stop extending from said probe threads to said second end.

16. The spindle assembly of claim 15, further comprising a spindle shaft set comprising said probe pin, and further comprising
an upper spindle shaft, comprising a threaded spindle shaft receptacle with a receptacle end wall,
said probe threads capable of being screwed into said threaded spindle shaft receptacle, and
said second end of said probe pin contacting said receptacle end wall when said probe threads are screwed into said threaded spindle shaft receptacle.

17. The spindle assembly of claim 16,
said upper spindle shaft further comprising
an upper section,
a lower section, and
an undercut section located between said upper section and said lower section.

18. The spindle assembly of claim 16,
said spindle comprising a spindle bore; and
said probe pin and said upper spindle shaft capable of being inserted into said spindle bore.

19. The spindle assembly of claim 18,
further comprising a spindle stop connected with said upper spindle shaft,
said spindle stop capable of limiting axial motion of said upper spindle shaft relative to said spindle when said upper spindle shaft is inserted into said spindle bore.

20. The spindle assembly of claim 18, further comprising a locking collar capable of being affixed to said upper spindle shaft and
capable of limiting axial motion of said upper spindle shaft relative to said spindle when said upper spindle shaft is inserted into said spindle bore.

21. The spindle assembly of claim 18:
said spindle further comprising a spindle body and a nose;
said spindle body comprising a threaded body receptacle;
said nose comprising nose threads; and,
said nose threads capable of being screwed into said threaded body receptacle.

22. The spindle assembly of claim 21,
said nose threads being of an opposite handedness than said probe threads.

23. A spindle assembly comprising said probe pin of claim 15,
and further comprising:
an upper spindle shaft, comprising an upper section, a lower section, and an
undercut section, said undercut section located between said upper section and said lower section;
said lower section of said upper spindle shaft further comprising a threaded spindle shaft receptacle with a receptacle end wall, said probe threads capable of being screwed into said threaded spindle shaft receptacle, and said second end of said probe pin contacting said receptacle end wall when said probe threads are screwed into said threaded spindle shaft receptacle;
a spindle comprising a spindle bore, said probe pin and said upper spindle shaft capable of being inserted into said spindle bore; and,
a locking collar capable of being affixed to said upper spindle shaft.

24. The spindle assembly of claim 23:
said spindle comprising a spindle body and a nose;
said spindle body comprising a threaded body receptacle;
said nose comprising nose threads;
said nose threads capable of being screwed into said threaded body receptacle; and,
said nose threads being of an opposite handedness than said probe threads.

25. A method for assembling a spindle assembly, comprising the steps of:
providing an upper spindle shaft, comprising an upper section, a lower section, and an undercut section;
providing a spindle comprising a spindle bore; and,
inserting said upper spindle shaft into said spindle bore so that said upper spindle shaft can rotate with respect to said spindle.

26. The method of claim 25, further comprising the steps of:
providing a locking collar; and,
affixing said locking collar to said upper spindle shaft.

27. The method of claim 25, further comprising the steps of:
providing a spindle body comprising a threaded body receptacle;
providing a nose comprising nose threads; and,
screwing said nose threads into said threaded body receptacle to form said spindle.

28. A method for assembling a spindle assembly, comprising the steps of:

providing a probe pin comprising a probe knob with a support ledge at a first end, probe threads vicinal to a second end distal to said first end, and a depth stop extending from said probe threads to said second end;

providing an upper spindle shaft comprising a threaded spindle shaft receptacle with a receptacle end wall;

providing a spindle comprising a spindle bore;

inserting said probe pin and said upper spindle shaft into said spindle bore; and, screwing said probe threads into said threaded spindle shaft receptacle.

29. The method of claim 28, further comprising the steps of:

providing a locking collar comprising a collar bore; and, affixing said locking collar to said upper spindle shaft.

30. The method of claim 29, wherein said providing a spindle comprises providing a spindle body;

providing a nose;

connecting said nose with said spindle body to form said spindle.

31. The method of claim 29, further comprising the steps of:

providing a positioning jig comprising a support shoulder and an insertion pin connected with said support shoulder;

inserting said insertion pin into said collar bore of said locking collar so that said support shoulder contacts said locking collar; and, inserting said upper spindle shaft into said collar bore so that said upper spindle shaft contacts said insertion pin.

32. The spindle assembly of claim 14, wherein said probe pin, said probe knob, and said support ledge are formed as a single piece.

* * * * *